E. HEFFERNAN.
FRICTION TYPE HINGE.
APPLICATION FILED APR. 14, 1920.
1,366,657.
Patented Jan. 25, 1921.
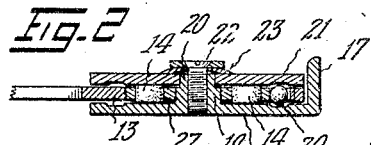
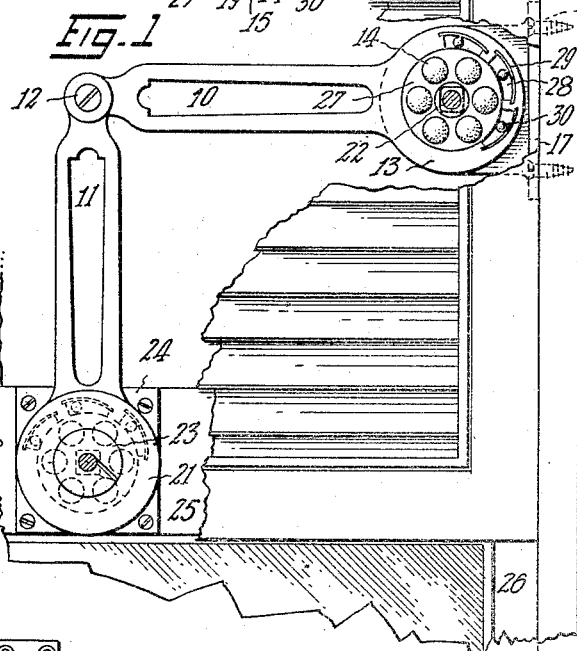
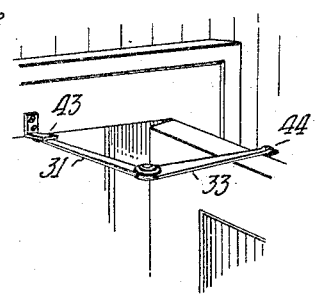
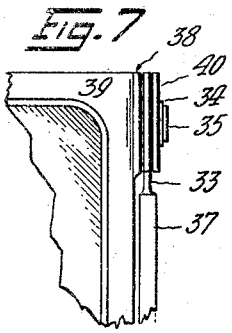
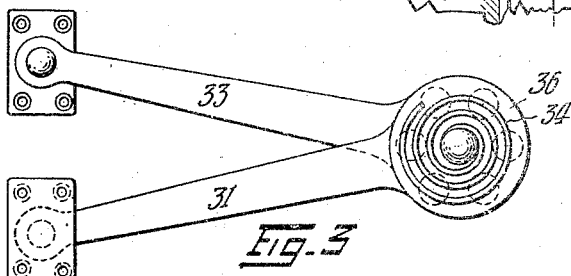
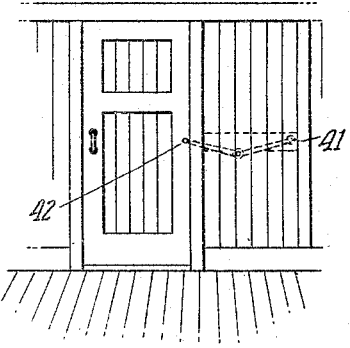
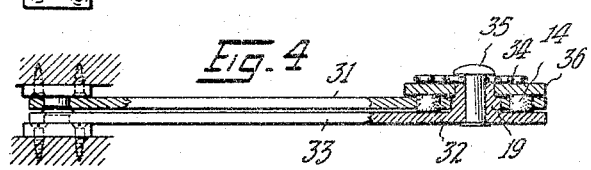
Inventor
Edward Heffernan
by [signature]
his Attorney

UNITED STATES PATENT OFFICE.

EDWARD HEFFERNAN, OF DOUGLAS LANE, NEAR SYDNEY, NEW SOUTH WALES, AUSTRALIA.

FRICTION-TYPE HINGE.

1,366,657.   Specification of Letters Patent.   Patented Jan. 25, 1921.

Application filed April 14, 1920. Serial No. 373,878.

*To all whom it may concern:*

Be it known that I, EDWARD HEFFERNAN, a subject of the King of Great Britain and Ireland, and a resident of Douglas Lane, near Sydney, New South Wales, Australia, have invented certain new and useful Improvements in Friction-Type Hinges, of which the following is a specification.

This invention relates to frictional hinge joints for carrier arms and stays for supporting sliding windows or shutters and for holding doors, windows, windshields, and like fixtures so as to impose frictional retardation to the movement thereof, thus to prevent slamming and accidental movement due to wind pressure, vibration, or like causes.

In the accompanying drawings, Figure 1 is a sectional elevational view of a friction joint carrier according to this invention shown applied for suspending a railway carriage window, the window and window frame structure being shown broken away and the carrier having two frictional elements with a one-way grip device associated with each of them; Fig. 2 is a transverse section through one of the friction pivots of the joint shown in Fig. 1; Fig. 3 is an elevational view of a modified form of joint having only one frictional element, without the one-way fitting; Fig. 4 is a sectional view corresponding with Fig. 3; Fig. 5 is a fragmentary perspective view showing a joint such as that in Figs. 3 and 4 applied as a door holder; Fig. 6 is an elevational view suggestive of the arrangement adopted when either type of the apparatus is fitted to a sliding door, such as a ship's cabin door to hold it in closed, open, or partially open position; and Fig. 7 is a fragmentary view suggestive of the fitting of one of these frictional joints as a mounting for an automobile wind shield.

Referring to Fig. 1, the carrier comprises two jointed members 10 and 11 which are of identical construction and are pivotally connected together at ends by a free pintle pin 12. As shown the arms 10 and 11 are punched out centrally to diminish weight. At its outer end each arm (10—11) is expanded to ring form (13) which ring encircles a disk 27, and a plurality of holes (4 or more usually) are drilled through the disk symmetrically around its center. In these holes plugs 14 of cork are set. The cork is slightly compressed to facilitate its entrance into the holes, and so that when it expands it will bind tightly therein. The faces of the cork plugs 14 project slightly beyond the faces of the disks 27. This is clearly shown in Fig. 2. 15 is a fixed mounting plate, the base portion of which is adapted to be screwed up to the window frame 16 for which purpose it may be formed with a flange 17, 18 being the mounting screws. Centrally the mounting plate 15 is formed with a stud pivot 19, the upper end 20 of which is squared. On the squared head 20 of the mounting pivot 19 a cover disk 21 having a square hole in it is set. This cover disk is held in position by a screw or rivet 22, a spring washer 23 being fitted below the screwed head to bear upon the disk 21. The cork plugs 14 frictionally contact with the opposed faces of the base plate 15 and the cover disk 21 so that depending upon the tightness of the adjusting of the screw 22 frictional resistance is imposed upon the rotational movement of the arm carrying the ring 13 and the disk 27 by reason of the contact of the cork plugs 14 with the parts 15 and 21. The degree of tension may be more or less according to the service required.

Inasmuch as the weight of the sash 26 must be sustained by the carrier it is obvious that if an equal degree of retardation were imposed by the carrier movement of the sash, considerable force would be required to lift the sash if the frictional retardation imposed were sufficient to prevent the sash sliding down to a closed position by reason of its weight. A compensating device is therefore provided having for its object to free the sash in its upper movement from frictional retardation applied in the joints while submitting the sash to such frictional retardation in the reverse downward movement. This compensating device is shown in Figs. 1 and 2. The disk 27 is freely rotatable in the ring 13, and carries the cork plugs 14. One or more pockets 28 are formed in the ring 13. The outer faces of these pockets are tangentially curved and may be shod with a strip of hard metal 29. Within each pocket a steel ball 30 is located. At the wider end of the pocket the ball 30 is free but the pocket dimensions are proportioned so that when the ball 30 is brought toward the narrow end of the pocket it binds between the shoe piece 29 and the edge of the friction disk 27 thereby locking the friction disk 27 to the ring 13.

When the arm 10 is raised (as it would be in the lifting movement of the sash 26) the "free-wheel" engagement of the balls 30 is released and the ring 13 rotates freely, no retardation being imposed on it by means of the cork plugs 14, because the disk 27 which carries said plugs is not rotated. In the downward movement of the arm 10, however, the balls 30 immediately bind and lock the ring 13 to the disk 27 so that the frictional retardation caused by the contact of the cork plugs 14 with the parts 15 and 21 operates to retard the downward movement of the arm.

It will be noted that the pockets 28 must be so located that the balls 30 come to locking position by gravity. A back spring might, however, be provided as is known in the art and free-wheel clutch springs to force the balls 30 to the engaging position when the device is used in any arrangement where gravity action of the balls 30 to bring them to locking position is not available. When the frictional retardation due to the cork plugs 14 is neatly adjusted by means of the setting of the screw 22 and the flexure of the spring washer 23, the gravity action tending to close down the sash 26 will be insufficient to cause downward movement of the sash and the sash will hang suspended by the carrier, but a little pressure will suffice to effect closing of the sash; just sufficient hand pressure to overcome the frictional excess in the joint being necessary. In the lifting movement of the sash therefore only the weight of the sash, which need not be counterbalanced, must be overcome by manual action.

The mounting plate 24 in connection with the arm 11 is made a little differently from the mounting plate 15 which is adapted to be attached to the frame 16. The plate 24 is adapted to be fixed to the top rail 25 of the sliding sash 26, but otherwise the construction of the frictional joint is substantially identical with that of the frictional joint at the outer end of the arm 10.

Fig. 3 shows the elementary form of the joint which is the more convenient form to use for such purposes as the holding of a door, the arrangement for which is indicated in Fig. 5. The cork plugs are in this case inserted in the disk head of the arm 31 while the pivot post 19 is integral with the disk head 32 on the end of the other arm member 33. The spring shown in this case is a volute type spring 34 and in place of the screw 22 a rivet 35 is used. Quite obviously a buckle disk type of spring washer, or any other convenient type of spring washer, may be interposed between the head of the screw 22 or the rivet 35 to hold the parts in frictional engagement. 36 is a washer having a square hole in it which is set on the square head of the pivot stud 19 so that it is non-rotatable in relation to the disk head 32 of the arm 33.

For an automobile wind screen the Fig. 4 arrangement is used, the arrangement being clearly indicated in Fig. 7 where the numeration corresponds with the numeration in Figs. 3 and 4, the arm 33 here corresponding with the top part of the stanchion 37. 38 is a disk face on the shield frame 39, 40 a washer corresponding with the washer 36, 35 being the head of the assembling screw or nut thereon and 34 the spring washer.

For the Fig. 6 arrangement, that is for the horizontal sliding door, either form of carrier or stay shown in Fig. 1 or Fig. 3 respectively may be used. One terminal element 41 is mounted on the body structure and the other terminal element 42 is mounted on the door. When the parts are positioned so that the joint comes nearly straight, as shown in Fig. 6, the door is held so firmly closed that considerable force is required to start its opening movement, but owing to the toggle action, as the joint collapses, the opening movement eases progressively. The clutch device may be used optionally in this arrangement according to the necessities of the particular case.

As shown in Fig. 5 the terminal ends of the joints are pivotally carried on brackets such as 43—44 or otherwise conveniently, and the parts are positioned in relation to the hinged center so that when the door is in closed position the joint sets snugly in its collapsed shape close up to the architraves.

The dimensions of the parts will vary according to the particular service for which the carrier or stay is required. For purposes of a door holder as indicated in Figs. 5 and 6, or a railway carriage window as indicated in Fig. 1, cork plugs from $\frac{1}{4}''$ to $\frac{1}{2}''$ in diameter provide efficient frictional retardation under relatively light spring pressure. It is preferable to shield or inclose the spring 23 or 34 by the cap nut or the head of the screw or rivet so as to provide a satisfactory external fitting.

Obviously the pawl and detent device as well known in the art may be substituted for the ball clutch device described with reference to Figs. 1 and 2.

In practice it has been found that the only resilient material which is entirely suitable for the frictional pads 14 is cork; but asbestos, fiber, or other frictional materials are usable instead of cork though with inferior results.

What I claim as my invention and desire to secure by Letters Patent is:—

1. In a friction type hinge, an arm carrying a ring, a disk encircled by said ring, friction members supported by said disk, and means against which said friction members are adapted to bear.

2. In a friction type hinge, an arm carrying a ring, a disk encircled by said ring, friction members supported by said disk, means against which said friction members are adapted to bear, and a one-way clutch device interposed between said disk and said ring.

3. A frictional joint in which two terminally jointed members are fitted with means for permitting them to be angularly moved in one direction the one relatively to the other, and for frictionally resisting relative angular movement of said members in another direction.

4. A jointed carrier comprising two arms terminally connected by a pivot joint, and at the free end of one or of both of said arms a mounting plate and a cover plate attachable to relatively movable elements, said plates carrying a pivot center for said arm and accommodating between said arm and said pivot a disk rotatably housed in a circular hole in said arm and engageable with said arm by a one-way clutch, said disk carrying a plurality of resilient pads embraced frictionally between said mounting plate and said cover plate.

5. A suspension joint arm comprising two arms terminally connected by a pivot, and at the free end of each of said arms a pivotal mounting attachable the one to the frame and the other to the sash, said pivotal mounting containing a frictional element and a one-way clutch adapted to engage said frictional element and retard the arm movement when the arms are moved in the direction of alinement and to liberate said frictional element when the arms are moved toward each other.

6. A suspension joint arm, comprising two arms terminally connected by a pivot and at the free end of either or both of said arms a circular head circularly apertured, and rotatably housed within said aperture a disk carrying a plurality of cork pads projecting through seating holes therein, a one-way clutch device between said disk and said circular head, and a mounting plate and a cap with a pivot center for carrying said disk between them with a spring washer clamping device for embracing said pad disk with a controllable degree of pressure between said mounting plate and said cap.

In witness whereof I have hereunto signed my name this 17th day of February, A. D. 1920, in the presence of two subscribing witnesses.

EDWARD HEFFERNAN.

Witnesses:
 THOMAS K. FLANAGAN,
 R. W. CROOK.